3,849,550
THERAPEUTIC COPOLYMER

Dvora Teitelbaum, Ramat Gan, and Asher Meshorer, Tsvi Hirshfeld, Ruth Arnon, and Michael Sela, Rehovot, Israel, assignors to Yeda Research and Development Co. Ltd., Rehovot, Israel
No Drawing. Filed Mar. 31, 1972, Ser. No. 240,244
Claims priority, application Israel, Apr. 21, 1971, 36,670
Int. Cl. A61k 27/00
U.S. Cl. 424—78           5 Claims

ABSTRACT OF THE DISCLOSURE

A composition of matter for use in the treatment or prevention of certain autoimmune diseases affecting the brain, being a water-soluble copolymer having a molecular weight above 15000 and a net positive electrical charge, comprising an amino acid of a positive electrical charge in combination with a lesser quantity of an amino acid of a negative electrical charge; if desired together with an amino acid without electrical charge; and, if desired, together with an aromatic amino acid adapted to provide immunogenic properties.

BACKGROUND OF THE INVENTION

Experimental allergic encephalomyelitis (EAE) is an autoimmune disease affecting the brain. EAE serves as a model disease for multiple sclerosis, post-infectious encephalitis, and subacute panencephalitis. Curative agents suitable for the treatment of EAE are of interest for the possible treatment of these further diseases.

EAE is induced in laboratory animals by an injection of brain tissue or by an injection of a purified encephalitogenic basic protein (BE) in complete Freund's adjuvant. The disease is characterised clinically by paralysis of the hind legs of laboratory animals, and histologically by perivascular infiltration of the brain tissue.

Hitherto two general methods have been applied for suppressing this disease (EAE): one uses immunorepressive agents, the other uses the encephalitogen itself without complete Freund's adjuvant. It has recently been found that other basic neural proteins have a similar effect when injected in incomplete Freund's adjavent.

DESCRIPTION OF THE PRESENT INVENTION

The present invention relates to a novel agent for the treatment of allergic encephalomyelitis.

In accordance with the invention, there is provided a composition adapted to cure or at least reduce the severity of EAE, bringing about either a complete cure if applied at an early enough stage, or at least decreasing substantially the overall mortality of the disease. Alternatively, the novel agent can also be used to immunize against EAE.

The novel compositions of matter according to the present invention, to be used for the treatment of EAE, and for obtaining protection against this autoimmune disease, comprises a synethetic water-soluble copolymer consisting of a plurality of amino acids, the molecular weight of the copolymer being in excess of 10,000 and preferably above about 18,000, and the copolymer being characterised by a net positive electrical charge and by a content of a lesser quantity of a negative electrical charge. The copolymer may contain as a further component a neutral amino acid, and if desired also an amino acid adapted to provide immunogenic properties.

Compositions according to the present invention comprise a basic copolymer with a net positive electrical charge, comprising a suitable quantity of an amino acid of positive electrical charge, such as lysine or arginine, in combination with a lesser quantity of an amino acid with a negative electrical charge, such as glutamic acid or aspartic acid, possibly in combination with an electrically neutral amino acid such as alanine or glycine, serving as a filler, and possibly with an amino acid adapted to confer on the copolymer immunogenic properties, such as an aromatic amino acid.

Various copolymers were prepared and it was found that those having a suitable molecular weight, a net overall positive electrical charge and content of a lesser quantity of negative charge amino acid, were suitable for the intended use.

Various copolymers of the above type were tested as to their encephalitogenic activity, as well as to their capacity to suppress the disease to be treated. None of the copolymers had any encephalitogenic activity, while copolymers fulfilling the above criteria were found suitable as curative agents for EAE.

A preferred copolymer according to the present invention comprises in combination alanine, glutamic acid, lysine and tryosine, of net overall positive electrical charge and of a molecular weight of about 20,000 to 25,000. The composition of these, which is given by way of example only, was about as follows: (molar ratio of amino acids in copolymer); alanine/glutamic acid/lysine/tyrosine= 6/2/4.5/1. Similar results were obtained with a soluble copolymer comprising tyrosine, aspartic acid, alanine and lysine in a molar ratio of 1:1:5:5:3.5; and with another such copolymer comprising glutamic acid, alanine and lysine in a molar ratio of about 1.5:5:3.5.

It is clear that this is given by way of example only and that the composition can be varied both as regards constituents and relative proportion of the constituents if the above general criteria are adhered to.

Copolymers of the type set out in the preceding passage were effective in suppressing EAE in guinea pigs when administered in saline as late as 5 days after challenge with basic protein (BE), and reduced the incidence of EAE from 64% in the control group to 22%; the histological lesions were also substantially decreased both in prevalence and in severity.

A similar protective effect was obtained with rabbits. EAE, induced by 500 µg. of BE per rabbit was suppressed by three injections of 8 mg. each of the first copolymer solution in 1 ml. saline, injected 1, 6 and 11 days after the challenge with BE. The incidence of the disease was decreased from 70% in the control group to 19% in the treated group. Groups of 20 animals each were used.

As the novel copolymers are devoid of encephalitogenic activity and as they are not immunorepressive, they are considered to be of advantage as compared with the curative agents available hitherto.

Copolymers according to the present invention are easily prepared by conventional procedures. The first of the above copolymers was prepared from the N-carboxyanhydrides of tyrosine, alanine, γ-benzyl glutamate and ε-N-trifluoroacetyllysine. The polymerisation was carried out at ambient temperature in anhydrous dioxane with diethylamine as initiator. The deblocking of the γ-carboxyl group of the glutamic acid was affected with hydrogen bromide in glacial acetic acid and was followed by the removal of the trifluoroacetyl groups from the lysine residues by 1 M piperidine.

According to a further embodiment, the novel compositions of matter can also be used in a different manner. The most simple manner of application is to inject a suitable quantity of the novel copolymer in a suitable medium as soon as possible after exposure of the body to the encephalitogenic basic protein.

An injection of the novel copolymers prior to the exposure of BE is not effective and the copolymers as such are not suitable as vaccination agents if injected in physiological saline.

On the other hand, it has been found that when a small quantity of the encephalitogenic agent is first administered, followed by injections of predetermined quantities of a copolymer according to the invention at certain intervals of time, there is obtained an effective protection against the subsequent exposure to BE, even in large quantities.

For example, guinea pigs were injected with 10 μg. of BE. This quantity is enough to bring about the disease EAE.

When guinea pigs were injected with 1/100 of this quantity, i.e. 0.1 μg., and afterwards there were periodically injected (after 1, 5 and 10 days) 1 mg. quantities of the copolymer, followed by injection of a large quantity of BE 10 days after the last injection of the copolymer, the animals were fully protected against this disease.

This course of action provides a possibility of protection against other autoimmune diseases of the same type.

It is clear that the above examples are by way of illustration only and that these are to be construed in a non-limiting manner.

What is claimed is:

1. A therapeutic preparation for use in the treatment or prevention of experimental allergic encephalomyelitis, comprising a water-soluble copolymer having a molecular weight in excess of 15,000 and up to 25,000, a net positive electrical charge, and being selected from the group consisting of a copolymer of a mixture consisting essentially of (1) alanine, glutamic acid, lysine and tyrosine in the molar ratio of about 6 parts alanine to 2 parts glutamic acid to 4.5 parts lysine to 1 part tyrosine; (2) alanine, aspartic acid, lysine and tyrosine in the molar ratio of about 5 parts alanine to 1.5 parts aspartic acid to 3.5 parts lysine to 1 part tyrosine; and (3) alanine, glutamic acid and lysine in the molar ratio of about 5 parts alanine to 1.5 parts glutamic acid to 3.5 parts lysine; in an amount effective for treatment or prevention of the said disease, dispersed in a pharmaceutically acceptable carrier for injectable administration.

2. A therapeutic preparation for use in the treatment or prevention of experimental allergic encephalomyelitis, comprising the composition set forth in claim 1, wherein the copolymer is the copolymer of alanine, glutamic acid, lysine and tyrosine.

3. A therapeutic preparation for use in the treatment or prevention of experimental allergic encephalomyelitis, comprising the composition set forth in Claim 1, wherein the copolymer is the copolymer of alanine, aspartic acid, lysine and tyrosine.

4. A therapeutic preparation for use in the treatment or prevention of experimental allergic encephalomyelitis, comprising the composition set forth in Claim 1, wherein the copolymer is the copolymer of alanine, glutamic acid and lysine.

5. A method for the treatment or prevention of experimental allergic encephalomyelitis, which comprises administering an effective amount of the composition of Claim 1 by injection to a host suffering from or subject to the said disease.

References Cited

UNITED STATES PATENTS

| | | | |
|---|---|---|---|
| 2,657,972 | 11/1953 | Woodward | 260—78 A |
| 3,704,282 | 11/1972 | Spector | 424—78 |

OTHER REFERENCES

Teitelbaum et al.: Eur. J. Immunol. (1971), 1, pp. 242–248.

STANLEY J. FRIEDMAN, Primary Examiner

U.S. Cl. X.R.

260—78 A; 424—319